(12) United States Patent
Sato

(10) Patent No.: US 7,474,338 B2
(45) Date of Patent: Jan. 6, 2009

(54) IMAGE CORRECTION PROCESSING DEVICE

(75) Inventor: Koichi Sato, Saitama (JP)

(73) Assignee: Hoya Corporation, Tokyo (JP)

( * ) Notice: Subject to any disclaimer, the term of this patent is extended or adjusted under 35 U.S.C. 154(b) by 753 days.

(21) Appl. No.: 10/617,779

(22) Filed: Jul. 14, 2003

(65) Prior Publication Data

US 2004/0012694 A1    Jan. 22, 2004

Related U.S. Application Data

(62) Division of application No. 09/050,868, filed on Mar. 31, 1998, now Pat. No. 6,650,365.

(30) Foreign Application Priority Data

Apr. 9, 1997  (JP)  ............................... P09-106705

(51) Int. Cl.
  *H04N 5/228* (2006.01)
(52) U.S. Cl. ................... 348/222.1; 348/231.6
(58) Field of Classification Search ............. 348/222.1, 348/231.6, 231.3, 231.7
  See application file for complete search history.

(56) References Cited

U.S. PATENT DOCUMENTS

| 5,034,804 | A | | 7/1991 | Sasaki et al. |
| 5,390,028 | A | * | 2/1995 | Kobayashi et al. ............. 386/31 |
| 5,446,744 | A | * | 8/1995 | Nagasawa et al. ........... 348/466 |
| 5,477,264 | A | | 12/1995 | Sarbadhikari et al. |
| 5,715,070 | A | * | 2/1998 | Tone et al. ................... 358/468 |
| 5,829,014 | A | | 10/1998 | Hayashi |
| 5,926,219 | A | | 7/1999 | Shimizu |
| 5,930,542 | A | | 7/1999 | Yamamoto et al. |
| 5,943,517 | A | | 8/1999 | Sato |
| 6,094,539 | A | | 7/2000 | Abe |
| 6,181,830 | B1 | | 1/2001 | Sato |
| 6,211,974 | B1 | | 4/2001 | Haneda |
| 6,515,698 | B1 | * | 2/2003 | Sasaki et al. ............. 348/231.6 |
| 6,515,699 | B2 | * | 2/2003 | Tanji et al. ................... 348/254 |
| 2001/0010520 | A1 | * | 8/2001 | Muramatsu ................. 345/522 |

FOREIGN PATENT DOCUMENTS

JP         7-212706    8/1995

* cited by examiner

*Primary Examiner*—Lin Ye
*Assistant Examiner*—Gevell Selby
(74) *Attorney, Agent, or Firm*—Greenblum & Bernstein, P.L.C.

(57) ABSTRACT

An image recording medium includes an image recording area in which an image signal can be recorded. The image signal is subjected to multiple image correction processes in a process order. The image recording medium also includes an information recording area in which data is recorded. The data indicates the process order in which the image correction processes were performed. An image signal process order system performs the image correction processes in a process order. The image signal process order system records the process order in the recording medium. An image signal process order device perform restoration process order in a restoration order. The restoring order is the reverse of the process order.

13 Claims, 5 Drawing Sheets

IMAGE CORRECTION PROCESSING DEVICE

The present application is a divisional of U.S. patent application Ser. No. 09/050,868, filed Mar. 31, 1998 now U.S. Pat. No. 6,650,365 entitled "Image Correction Information Recording Device", the disclosure of which is expressly incorporated herein by reference in its entirety.

BACKGROUND OF THE INVENTION

1. Field of the Invention

The present invention relates to an electronic still camera in which an image signal, obtained by an imaging device, for example, is subjected to an image correction process and recorded in a recording medium.

2. Description of the Related Art

A conventional electronic still camera is constructed in such a manner that an image signal obtained by an imaging device is subjected to image correction processes, including a white balance process, a gamma correction and so on, and then recorded in a recording medium. The image correction processes conform to the indication characteristics of a display device on which an image obtained by the electronic still camera is indicated, so that a color image, being as close as possible to the original image, can be reproduced, due to the image correction processes.

Conventionally, the display device cannot be changed. However, if the display device is changed to another display device, and the image signal, recorded in the recording medium, is reproduced to be indicated on the other display device, the image indicated by the other display device may not have a satisfactory quality, since the image signal has not been subjected to image correction processes conforming to the other display device.

SUMMARY OF THE INVENTION

Therefore an object of the invention is to provide an image correction device by which an image signal can be subjected to optimum image correction processes when using an arbitrary display device.

According to the present invention, there is provided an image correction information recording device provided in an electronic still camera, comprising an image correcting processor, an image signal recording processor and a processing order recording processor. The image correcting processor performs a plurality of image correction processes to an image signal in a processing order to generate a corrected image signal. The image signal recording processor records the corrected image signal in a recording medium. The processing order recording processor records the processing order in the recording medium.

Further, according to the present invention, there is provided an image recording medium comprising an image recording area and an information recording area. An image signal can be recorded in the image recording area. The image signal is subjected to a plurality of image correction processes in a processing order, which is also recorded in the information recording area.

Furthermore, an image signal processing device processes a corrected image signal, which has been obtained by performing a plurality of image correction processes to an image signal in a processing order. The device comprises a processing order determining processor and an image signal restoring processor.

The processing order determining processor determines the processing order. The image signal restoring processor performs restoration processes, the contents of which are the opposite of the image correction processes, to the corrected image signal in a restoring order, which is the reverse of the processing order.

Further, according to the present invention, there is provided an image signal processing system comprising an image correcting processor, an image signal recording processor, a processing order recording processor, a processing order reading processor, and an image signal restoring processor. The image correcting processor performs a plurality of image correction processes to an image signal in a processing order to generate a corrected image signal. The image signal recording processor records the corrected image signal in a recording medium. The processing order recording processor records the processing order in the recording medium. The processing order reading processor reads the processing order from the recording medium. The image signal restoring processor performs restoration processes, the contents of which are the opposite of the image correction processes, to the corrected image signal in a restoring order which is the reverse of the processing order.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
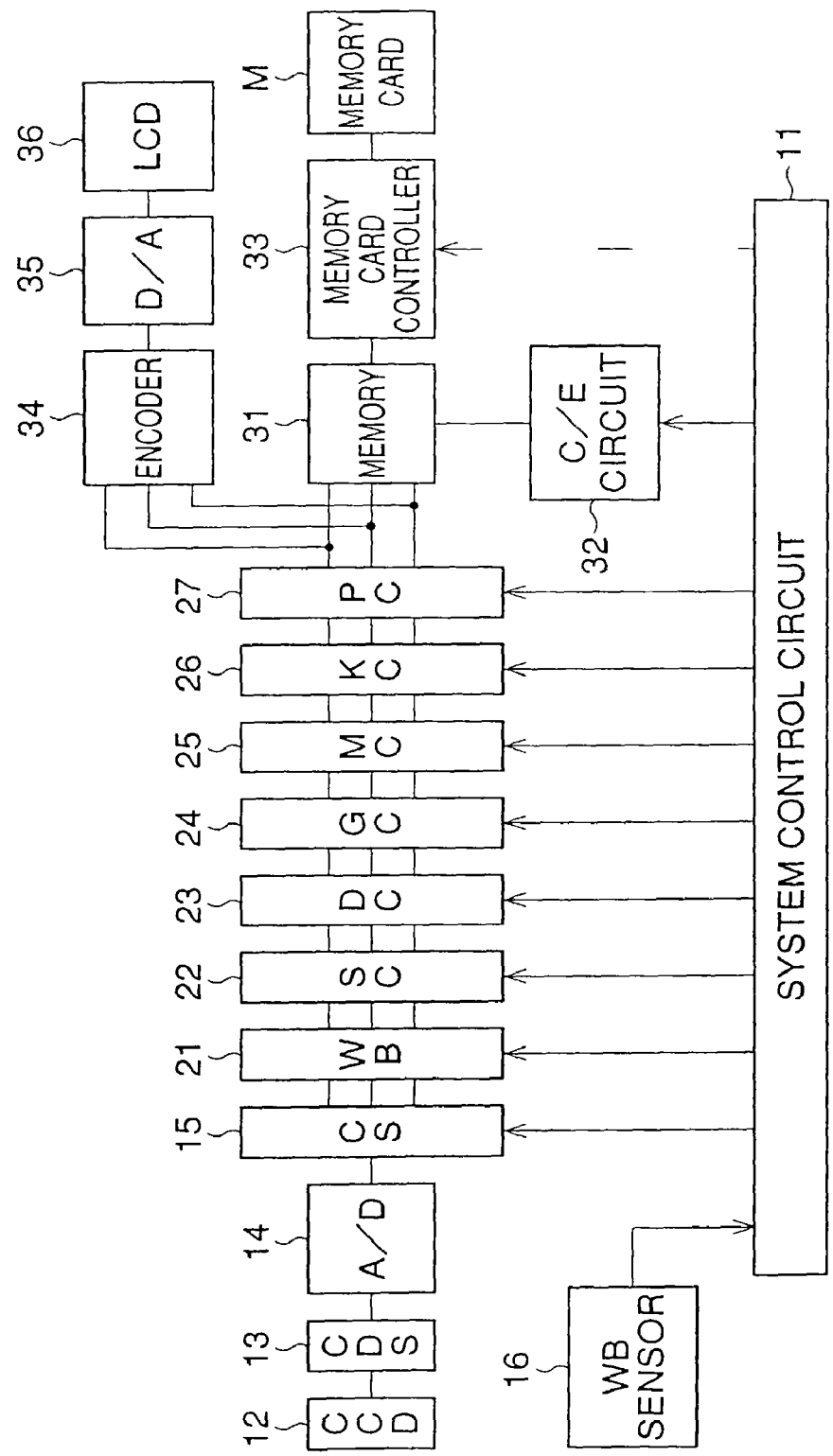
FIG. 1 is a block diagram of an electronic still camera having an image correction information recording device of an embodiment of the present invention.

The present invention will be described below with reference to embodiments shown in the drawings.

FIG. 1 shows a block diagram of an electronic still camera having an image correction information recording device of an embodiment of the present invention.

A system controller 11 has a microcomputer, by which the image correction information device is controlled as a whole. An imaging device (charge coupled device (CCD)) 12 is disposed on an optical axis (not shown), so that an image is formed on a light receiving surface of the CCD 12. The CCD 12 is provided with a color filter on the light receiving surface. The color filter having a red (R) filter element, a green (G) filter element and a blue (B) filter element, which are disposed in a predetermined arrangement, according to the Beyar method, for example. Pixel signals corresponding to the image formed on the CCD 12 are outputted from the CCD 12. Then, the pixel signals are subjected to a predetermined process, such as correlated double sampling (CDS), in a CDS circuit 13, and are converted into digital signals by an A/D converter 14. The digital pixel signals are separated into R, G and B pixel signals in a color separation (CS) circuit 15.

A color temperature sensor 16 is connected to the system control circuit 11, so that information indicating the color temperature of the ambient light of a subject to be photographed is inputted thereto. The R, G and B pixel signals are subjected to a white balance adjustment in accordance with the color temperature information in a white balance (WB) adjustment circuit 21. The pixel signals outputted from the white balance adjustment circuit 21 are subjected to a shading correction in a shading correction (SC) circuit 22. The pixel signals subjected to the shading correction are then inputted to a defect correction (DC) circuit 23, in which a defect correction is performed, so that a pixel signal corresponding to a photo-diode, which has a defect, existing in the CCD 12 is generated.

The pixel signals, to which the defect correction has been performed, are subjected to a gamma correction in a gamma correction (GC) circuit 24. The output signals of the gamma ($\gamma$) correction 24 are inputted into a matrix calculation (MC) circuit 25, in which a matrix calculation is carried out, so that the R, G and B pixel signals are converted into a luminance signal and a color difference signal. The luminance signal and the color difference signal are then inputted into a knee-process/color-depression (KC) circuit 26, in which the luminance signal is subjected to a knee process and the color difference signal is subjected to a color depression process. The output signals of the knee-process/color-difference circuit 26 are subjected to a peripheral correction in a peripheral correction (PC) circuit 27, so that an edge of the image is emphasized, for example.

The output signals of the peripheral correction circuit 27 are temporarily stored in a memory 31. The luminance signal and the color difference signal are read from the memory 31, and may be subjected to an image compression process, according to the JPEG algorithm, for example, in a compression/expansion circuit 32 to generate a compressed image signal. The compressed image signal is then temporarily stored in the memory 31, before being read to a memory card controller 33. Alternately, the image signal is read directly from the memory 31 to the memory card controller 33. The format of the compressed image signal or the image signal is converted to a predetermined format in the memory card controller 33, and thus the compressed image signal or image signal is recorded in a memory card (recording medium) M. The compressed image signal or image signal recorded in the memory card M, is read therefrom, and the format of the compressed image signal or image signal is converted to a predetermined format in the memory card controller 33, before being temporarily stored in the memory 31. The compressed image signal is subjected to an image expansion process, according to the JPEG algorithm, for example, and is re-stored in the memory 31.

The luminance signals and the color difference signals, which are read from the memory 31 or are outputted from the peripheral correction circuit 27, are converted to a video signal, according to the NTSC system in an encoder 34, which is then converted into an analog video signal by a D/A converter 35. Then, the analog video signal is inputted to a display device 36, having a liquid crystal display (LCD), so that an image is indicated on a surface of the liquid crystal display.

Figure 2:
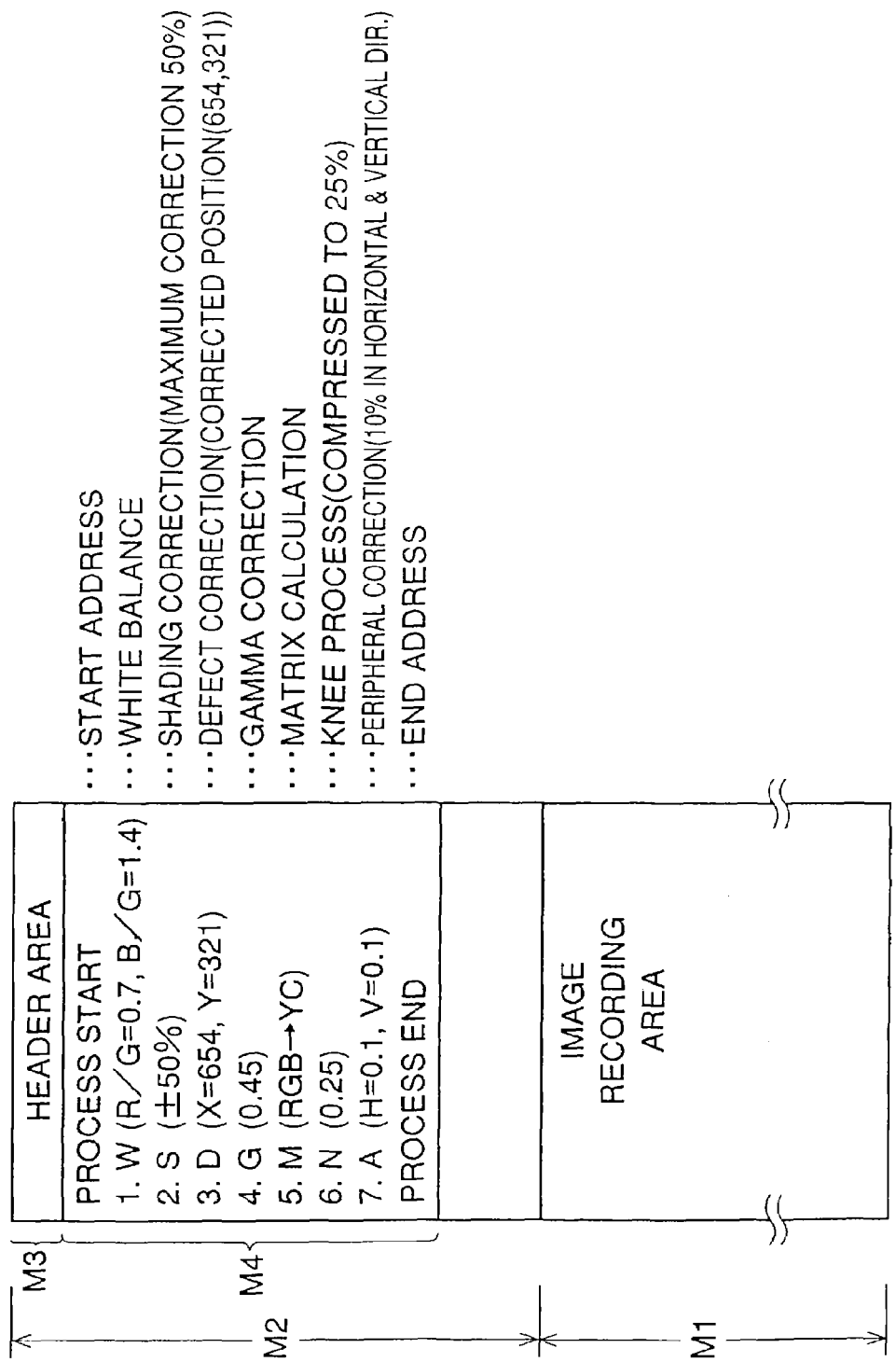
FIG. 2 is a view showing an example of the allocation of data areas of an image file formed in a memory card.

FIG. 2 is a view showing an example of the allocation of data areas of an image file formed in the memory card M (see FIG. 1). The image file is composed of an image recording area M1, in which an image signal is recorded, and an information recording area M2, in which information relating to the image recording area M1 is recorded. A compressed image signal, obtained from an image compression process of the compression/expansion circuit 32, or an image signal is recorded in the image recording area M1. The information recording area M2 has a header area M3 and an image processing order recording area M4. Information, generated when the compressed image signal or image signal is recorded in the image recording area M1, is stored in the header area M3. Data indicating a processing order, in which an image signal recorded in the image recording area M1 is processed in the white balance adjusting circuit 21, the shading correction circuit 22 and so on, are recorded in the image processing order recording area M4.

In the circuits shown in FIG. 1, the white balance adjustment, the shading correction, the defect correction, the gamma correction, the matrix calculation, the knee-process/color-depression and the peripheral correction are performed in this order. Accordingly, in the image processing order recording area M4 contained in the information recording area M2, data indicating the processing order are recorded by the system control circuit 11, via the memory card controller 33.

"PROCESS START" indicates a starting address of the image processing order recording area M4. "1. W(R/G=0.7, B/G=1.4)" implies that the white balance adjustment has been carried out first, in which a red normalization coefficient R/G is 0.7, and a blue normalization coefficient B/G is 1.4. "2. S($\pm$50%)" implies that the shading correction has been carried out second, in which the maximum correction amount is 50%. "3. D(X=654, Y=321)" implies that the defect correction has been carried out third, in which the coordinates or the position of the defect pixel is (654, 321). "4. G(0.45)" implies that the gamma correction has been carried out fourth, in which the gamma correction amount is 0.45. "5. M(RGB→YC)" implies that the matrix calculation has been carried out fifth, in which R, G and B pixel signals have been converted to a luminance signal and color difference signals. "6. N(0.25)" implies that the knee process has been carried out sixth, in which the compression amount is 25%. "7. A(H=0.1, V=0.1)" implies that the peripheral correction has been carried out seventh, in which the correction is performed in such a manner that the luminance difference in a periphery is emphasized by 10% in horizontal and vertical directions, respectively. "PROCESS END" implies the end address of the image processing order recording area M4.

Figure 3:
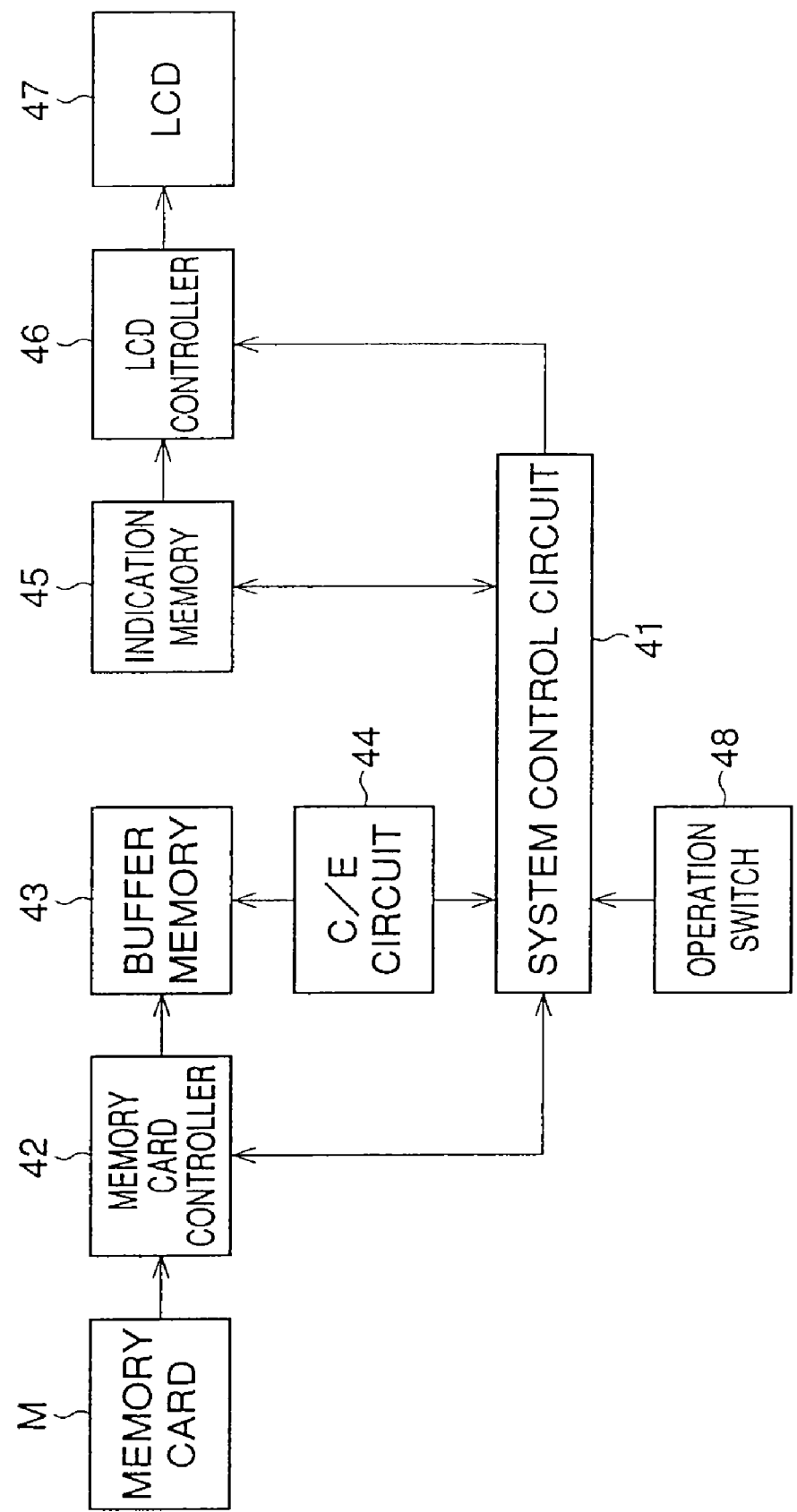
FIG. 3 is a block diagram of an image reproduction device of the embodiment of the present invention.

FIG. 3 shows a block diagram of an image reproduction device of the embodiment of the present invention. A system controller 41 has a microcomputer, by which the image reproduction device is controlled as a whole. Data indicating the processing order, in which the image correction processes are performed to the image signal, are recorded in the memory card M, in addition to the image signal, as shown in FIG. 2.

The memory card M is attached to a memory card controller 42. The format of the image signal, read from the memory card M, is converted to a predetermined format by the memory card controller 42, and then the image signal is stored in a buffer memory 43. The image signal is read from the buffer memory 43, and is then subjected to an image expansion process, if required, according to the JPEG algorithm, for example, in a compression/expansion circuit 44, so that an image signal, which has been compressed, is expanded to generate a non-compressed image signal, which is then stored in the buffer memory 43.

The image signal stored in the buffer memory 43 is read therefrom, and is stored in an indication memory 45. Then, the image signal is read from the indication memory 45, and is subjected to restoration processes, the contents of which are opposite to the contents of the image correction processes, which were performed prior to the image signal being recorded in the memory card M, in a restoring order which is the reverse of the processing order. Thus, the image signal, having been subjected to the restoration processes, is subjected to further sequence of predetermined image correction processes corresponding to the indication characteristics of the liquid crystal display (LCD) 47, and then, the format of the image signal is converted to a predetermined format by an LCD controller 46. The image signal is outputted to the LCD 47, whereby an image corresponding to the image signal is indicated on the LCD 47.

An operation switch 48, by which an image signal is read from the memory card M and a process, which includes an image process, is performed, is connected to the system control circuit 41.

Figure 4:
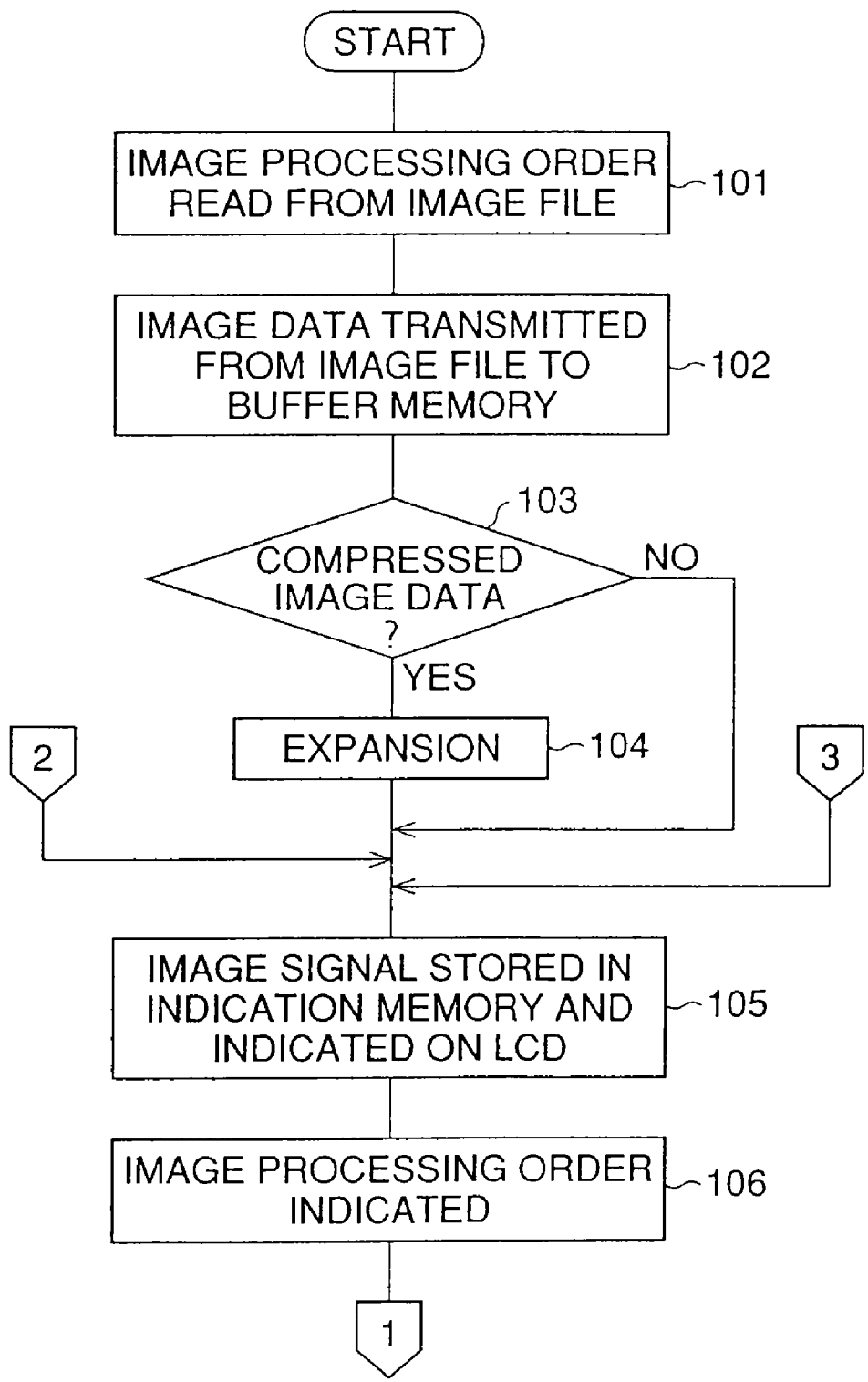
FIGS. 4A and 4B show a flow chart of a program by which an image signal is read from the memory card and indicated on a crystal display device.
Figure 4:
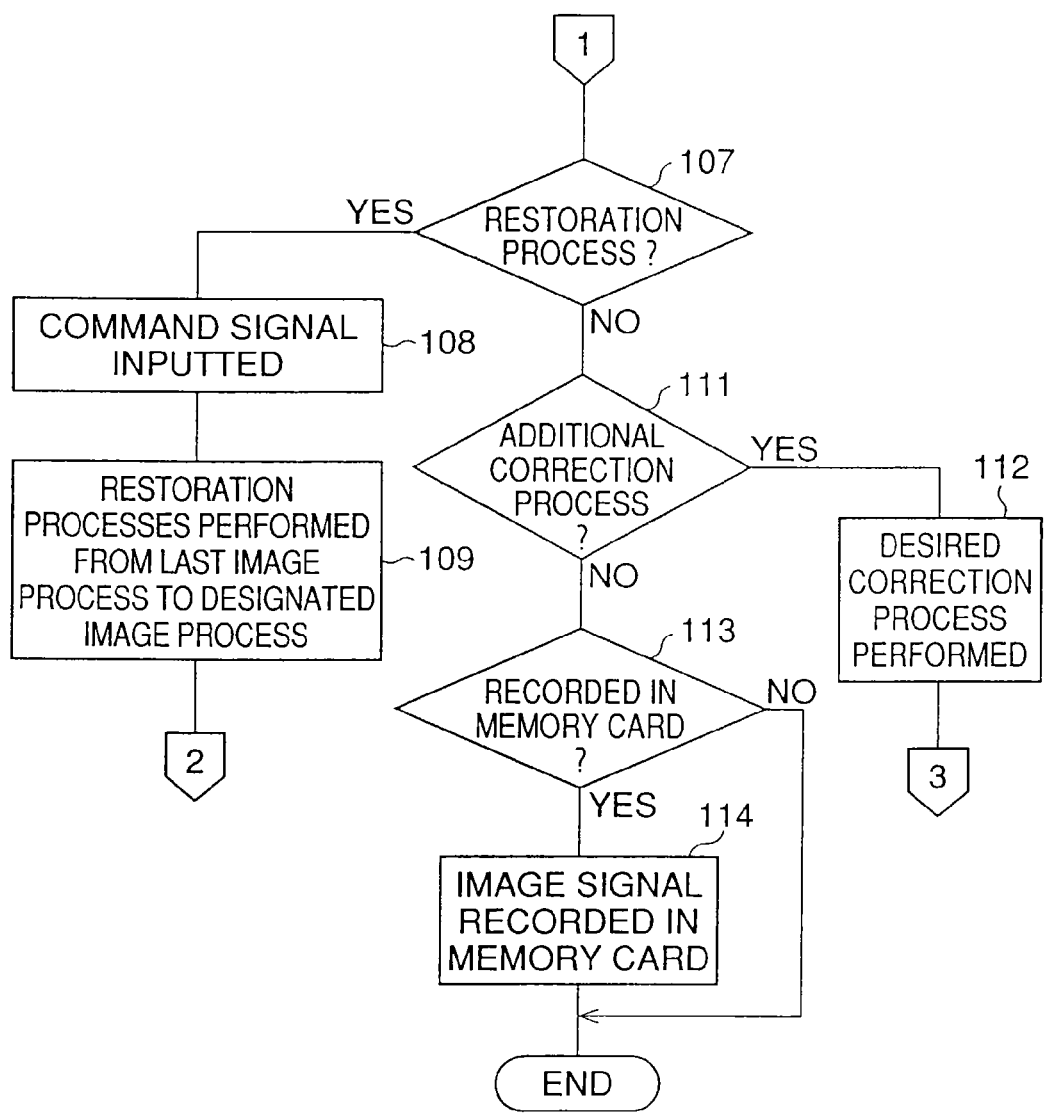

FIGS. 4A and 4B show a flow chart of a program by which the image signal is read from the memory card M and the image is indicated on the LCD 47. The program is executed by operating the operation switch 48.

In Step 101, an image file, which is designated by the operation switch 48, is accessed, so that the image processing order, recorded in the image processing order recording area M4, corresponding to the image file is read therefrom. In Step 102, the image signal recorded in the image recording area M1 of the image file is read therefrom, and transmitted to the buffer memory 43. In Step 103, based on the information recorded in the image recording area M1, it is determined whether the image signal has been subjected to an image compression process. When the image signal has been compressed, Step 104 is executed in which an image expansion process is performed on the compressed image signal, and when the image signal has not been subjected to the image compression process, Step 104 is skipped.

In Step 105, the obtained image signal is stored in the indication memory 45, and an image corresponding to the image signal is indicated on the LCD 47. In Step 106, the image processing order, read in Step 101, is superimposed on the image and thus also indicated on the LCD 47.

In Steps 107 through 109, the restoration processes, the contents of which being opposite to the image correction processes, are executed, based on an operation of the operation switch 48.

It is determined in Step 107 whether the restoration processes are to be performed. When the restoration processes are to be performed, the routine goes to Step 108, in which a command signal, indicating which stage the process should be returned to, is inputted in accordance with the operation of the operation switch 48. In Step 109, the restoration processes are carried out from the last image process to the image process designated by the operation switch 48, in the restoration processing order, in accordance with the processing order read from the memory card M. For example, regarding the image file shown in FIG. 2, when the process should be returned to the gamma process stage, the reverse of the peripheral correction, the reverse of the knee process, the reverse of the matrix calculation, and the reverse of the gamma correction are carried out in this order. The results of the calculations obtained from the execution of the reversed processes are stored in the buffer memory 43.

Then, the routine returns to Step 105, in which the image signal for indicating an image on the LCD 47 is stored in the indication memory 45, so that the image is indicated on the LCD 47. Then, in Step 106, the image processing order, read in Step 101, is superimposed on the image, so as to also be indicated on the LCD 47.

Step 107 is again executed, and when further restoration processes are to be performed, Steps 108 and 109 are re-executed. Conversely, when further restoration processes are unnecessary, the routine goes to Step 111.

In Step 111, it is determined, based on the operation of the operation switch 48, whether additional image correction processes are to be performed. For example, when the restoration processes have been performed as far as the gamma correction, as described above, and another gamma correction is required, the desired image correction process (i.e. the other gamma correction) is performed in Step 112, and the resulting image signal, obtained by the other gamma correction, is stored in the buffer memory 43. Then, the routine returns to Step 105, so that the operations described previously are executed again.

Conversely, when it is determined in Step 111 that additional image correction processes are unnecessary, Step 113 is executed in which it is determined whether the image signal, which is stored in the buffer memory 43 at present, i.e. stored in the buffer memory 43 in Step 109 or 112 when the restoration or correction processes were performed, is to be recorded in the memory card M. When the image signal is to be recorded in the memory card M, Step 114 is executed in which it is decided whether the image signal should be compressed and the resulting image signal is recorded in the memory card M. At this time, the new processing order (i.e. the altered processing order) is recorded in the image processing order recording area M4 of the memory card M, and thus the record of the processing order is renewed. If the image signal and the processing order need not be recorded in the memory card M, Step 114 is skipped, and this program ends.

As described above, in the embodiment, since the processing order of the image correction processes, which is performed on recording an image signal in the memory card M, is recorded in the memory card M, the opposite of the image correction processes can be performed. Therefore, when the image signal is read from the memory card M, to reproduce and indicate the image on an arbitrary display device, the image correction processes conforming to the indication characteristics of the display device can be performed, so that the image, indicated by the display device, has a high quality.

Note that the contents of the image correction processes, contained in the parentheses in FIG. 2, are not necessarily recorded in the memory card M. Namely, by recording only the processing order of the image correction processes in the memory card M, the image signal can be restored, with a relatively high accuracy, to a state equivalent to that prior to subjecting the image signal to the image correction processes, and therefore, an effect similar to that of the above described embodiment can be obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-106705 (filed on Apr. 9, 1997) which is expressly incorporated herein, by reference, in its entirety.

The invention claimed is:

1. An image signal process order device that processes a corrected image signal obtained by performing a plurality of image correction processes to an image signal in a process order, comprising:

a process order determining processor that determines the process order; and an image signal restoring processor that performs a plurality of restoration processes to the corrected image signal to restore the image signal, the plurality of restoration processes being performed in a restoring order which is the reverse of the process order,
wherein the plurality of image correction processes include a gamma correction.

2. An image signal process order system, comprising:
an image correcting processor that performs a plurality of image correction processes to an image signal in a process order to generate a corrected image signal, the plurality of image correction processes including a gamma correction;
an image signal recording processor that records the corrected image signal in a recording medium;
a process order recording processor that records the process order in the recording medium;
a process order reading processor that reads the process order from the recording medium; and
an image signal restoring processor that performs restoration processes to the corrected image signal to restore the image signal, the restoration processes being performed in a restoring order, which is a reverse of the process order.

3. The image signal process order device of claim 1, wherein data indicating the process order is recorded in an information recording area of an image recording medium, and the image signal is recorded in an image recording area of the image recording medium.

4. The image signal process order device of claim 1, further comprising an image recording medium that includes an image recording area in which the image signal is recorded, and an information recording area in which data indicating the process order is recorded.

5. The image signal process order system of claim 2, wherein data indicating the process order is recorded in an information recording area of the recording medium, and the image signal is recorded in an image recording area of the recording medium.

6. The image signal process order device of claim 1, further comprising a program to process the corrected image signal, the program comprising:
a processing order data reading section executable to read processing order data from a first area of a storage; and
an image data reading section executable to read image data from a second area of the storage.

7. The image signal process order device of claim 6, the program further comprising:
a compressed data determining section executable to determine whether the image data stored in the second area of the storage comprises compressed image data; and
an expansion section executable to expand the image data read from the second area of the storage when the compressed data determining section determines that the image data stored in the second area of the storage comprises compressed image data.

8. The image signal process order device of claim 6, the program further comprising:
an image data display section executable to display a first image based upon the image data read from the second area of the storage; and
a process order display section executable to display a second image based upon the processing order read from the first area of the storage.

9. The image signal process order device of claim 8, wherein the image data display section and the process order display section are configured to superimpose the first image with the second image.

10. The image signal process order device of claim 6, the program further comprising:
a restoration process determining section executable to determine whether at least one of the plurality of restoration processes is to be performed.

11. The image signal process order device of claim 10, the program further comprising:
a command input receiving section executable to receive an input command;
a process stage determining section executable to determine a processing stage in the restoring order in which the at least one of the plurality of restoration processes is to be performed, wherein the processing stage is determined based upon the input command.

12. The image signal process order device of claim 11, the program further comprising:
a restoration processing section executable to carry out at least one of the plurality of restoration processes on the corrected image signal based on the processing stage and the restoring order.

13. An image signal process order device that processes a corrected image signal obtained by performing a plurality of image correction processes to an image signal in a process order, comprising:
a process order determining processor configured to determine the process order;
an image correcting processor configured to perform the plurality of image correction processes to the image signal in the process order to generate the corrected image signal, the plurality of image correction processes including a gamma correction;
an image signal recording processor configured to record the corrected image signal in a first storage area of a recording medium;
a process order recording processor configured to record the process order in a second storage area of the recording medium;
an image signal restoring processor configured to perform a plurality of restoration processes to the corrected image signal to restore the image signal, the plurality of restoration processes being performed in a restoring order which is the reverse of the process order;
a process order reading processor configured to read the process order from the second storage area of the recording medium; and
an image data reading processor configured to read image data from the first storage area of the recording medium.

* * * * *